(No Model.) 3 Sheets—Sheet 2.
J. F. STEWARD.
CORN HARVESTING MACHINE.
No. 401,388. Patented Apr. 16, 1889.
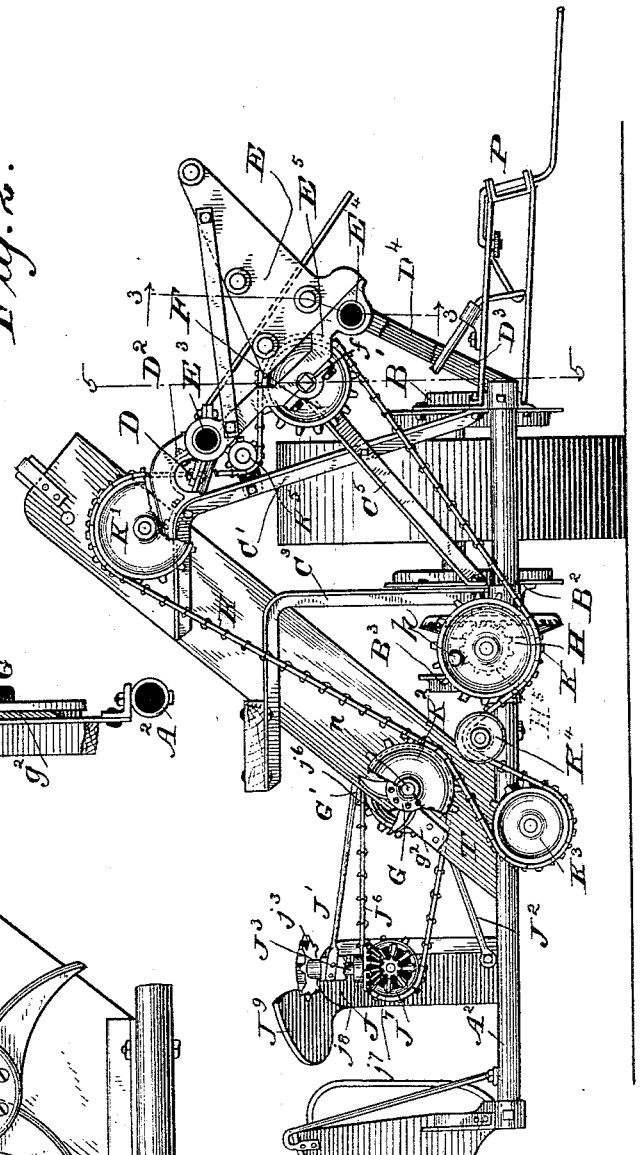
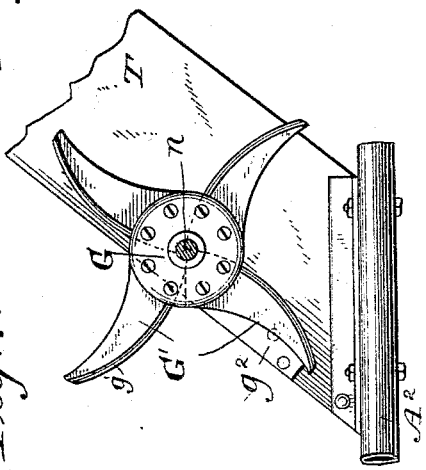
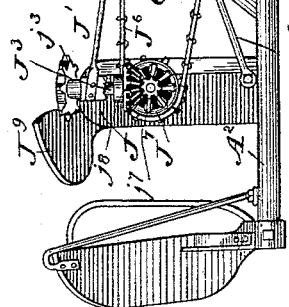
Witnesses.
Arthur Johnson
Jean Elliott
Inventor.
John F. Steward
By Burton & Burton
his Attorneys (No Model.) 3 Sheets—Sheet 3.
J. F. STEWARD.
CORN HARVESTING MACHINE.
No. 401,388. Patented Apr. 16, 1889.
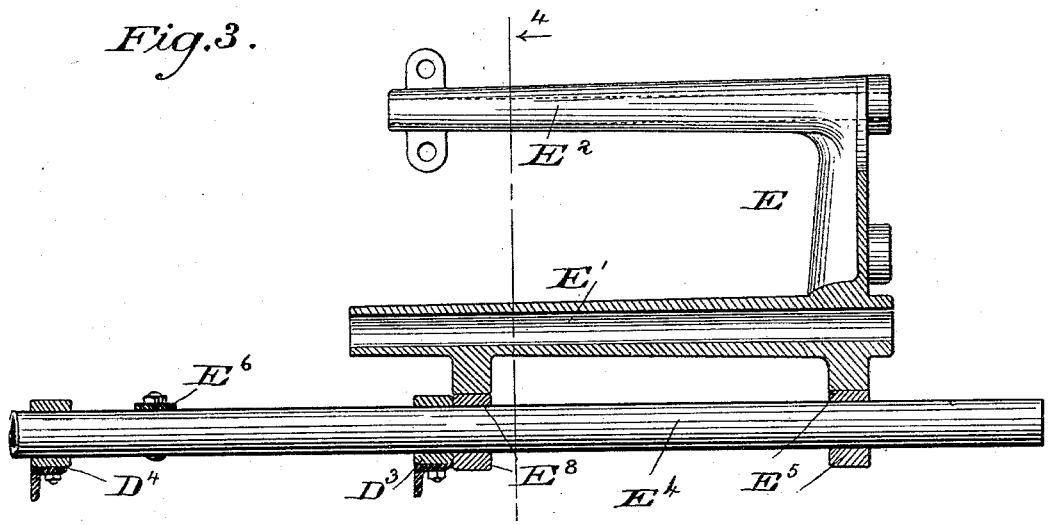
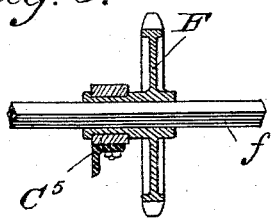
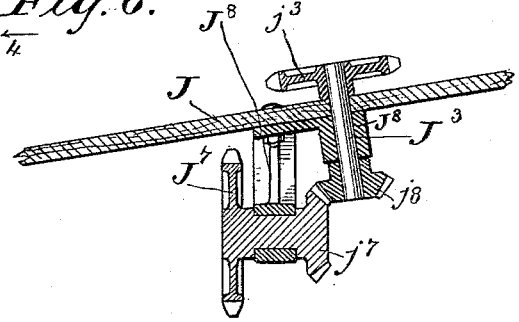
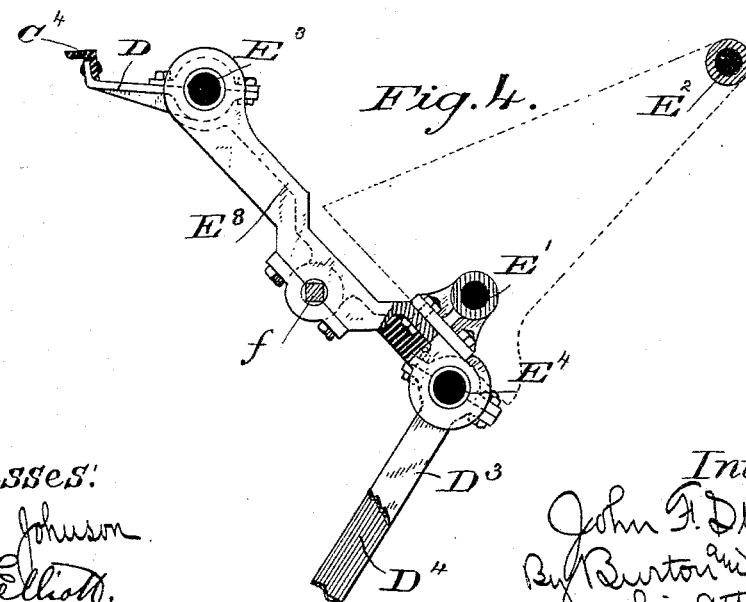
Witnesses:
Arthur Johnson
Jean Elliott
Inventor:
John F. Steward
By Burton & Burton
his attorneys

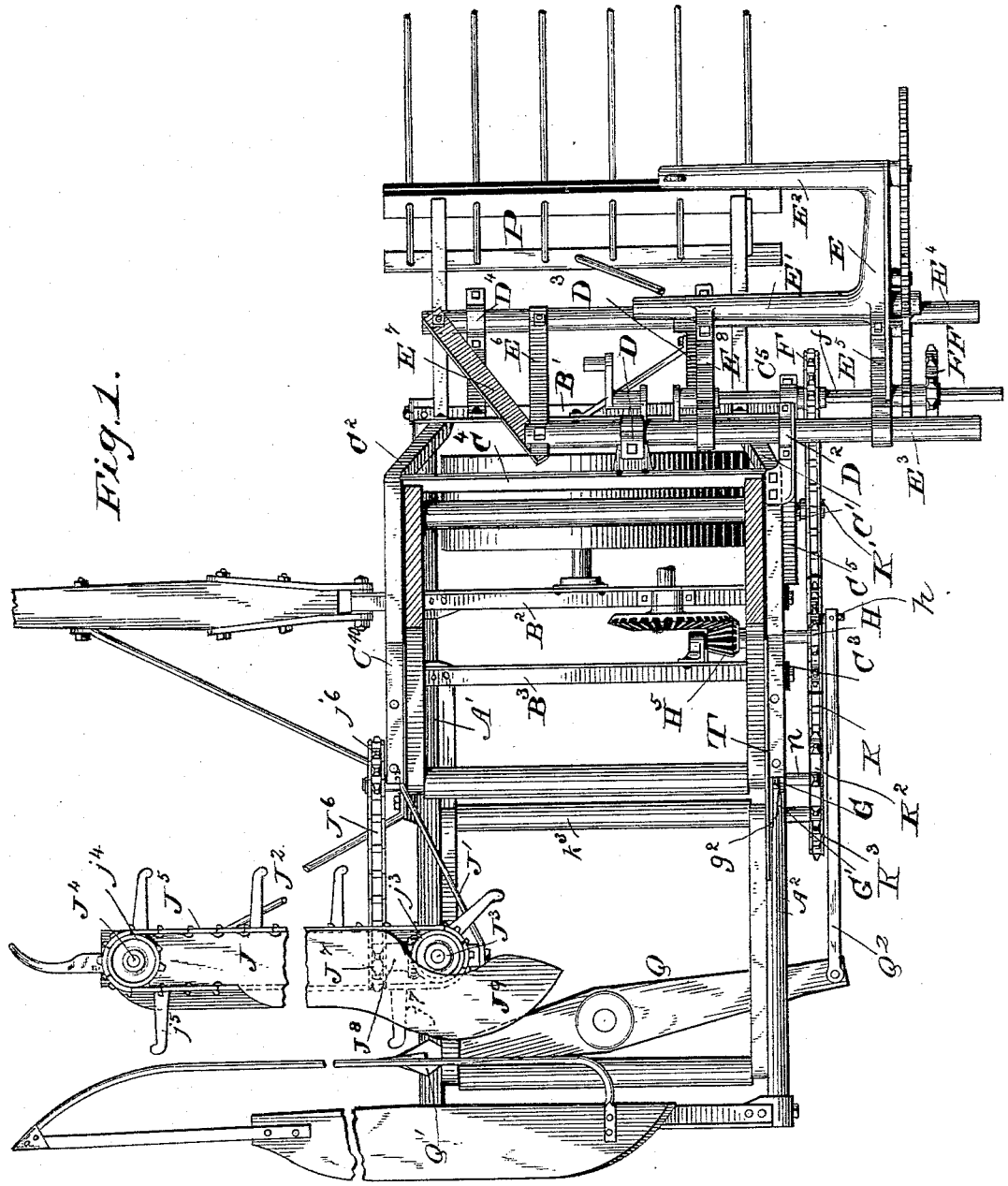

UNITED STATES PATENT OFFICE.

JOHN F. STEWARD, OF CHICAGO, ILLINOIS.

CORN-HARVESTING MACHINE.

SPECIFICATION forming part of Letters Patent No. 401,388, dated April 16, 1889.

Application filed February 23, 1888. Serial No. 264,972. (No model.)

*To all whom it may concern:*

Be it known that I, JOHN F. STEWARD, a citizen of the United States, residing at Chicago, in the county of Cook and State of Illinois, have invented certain new and useful Improvements in Corn-Harvesting Machines, which are fully set forth in the following specification, reference being had to the accompanying drawings, of which—

Figure 1 is a plan of the entire machine stripped of the conveyer and elevator canvases and binder-deck and part of the binder mechanism. Fig. 2 is a rear elevation having the binder-frame stripped of its mechanism. Fig. 3 is a section at the line 3 3 on Fig. 2, looking stubbleward. Fig. 4 is a sectional elevation of the binder-frame and part of its supports, the section being taken at the plane indicated by the line 4 4 on Fig. 3, and looking forward. Fig. 5 is an axial section through the main binder-driving sprocket-wheel and its journal-bearing, showing a square shaft, which slides through the hub of said wheel. Fig. 6 is a vertical section through 5 5 on Fig. 2, looking stubbleward. Fig. 7 is a detail rear elevation of the header on the elevator-frame. Fig. 8 is a grainward edge elevation of the same.

The general character of the structure of the main frame of this machine is substantially similar to that shown in Patents No. 351,181, to Kennedy and Kennedy, and in No. 351,268, to Kennedy, Kennedy, and Steward, both dated October 19, 1886, said frame comprising tubular front and rear sills, $A'$ $A^2$, joined by trusses $B'$, $B^2$, and $B^3$, and having posts, as $C'$ $C^2$, secured to the truss $B'$, and the posts $C^3$ and $C^{10}$, secured to the truss $B^2$, said posts forming supports for the elevator and assisting in supporting the binder. The forward post, $C^{10}$, which appears only in plan in Fig. 1, is in form like the post $C^3$ as the same is shown in elevation in Fig. 2.

As illustrated, the machine comprises gathering and cutting mechanism specially adapted to be used in cutting and binding Indian or other corn grown in hills or clumps. It is designed, however, with suitable change of gathering and cutting devices and platform, to be used also for cutting and binding of small grain grown in the usual manner. The cutting mechanism comprises a horizontal oscillating bar, Q, pivoted beneath the platform and carrying at its end the cutter $Q'$, and being connected at its rear end by the link or pitman $Q^2$ to the crank-pin $h$ on the wheel H. When used to bind Indian-corn stalks into bundles, it is constructed so as to apply the band around the comparatively slender tops above all the ears. This causes the bundle to spread wide at the bottom, so that each bundle will stand alone, or at least so that the bundles may be easily formed into shocks which will stand stably. In order that the band may be thus placed, the binder is put, necessarily, much farther toward the rear than in a grain-harvester, and the construction is altered in a few details to accomplish this. It will now be described in detail, in order to point out the peculiarities which are due to this necessity.

The posts $C'$ and $C^2$ are secured, respectively, to the rear and forward parts of the outer truss, $B'$, and are connected at their upper ends by a cross-bar of angle-iron, $C^4$. To said cross-bar, between the posts $C'$ and $C^2$, there is secured the bracket D. To the post $C'$ at the upper corner, where the bar $C^4$ is secured, there is secured, also, another bracket, $D^2$. The brackets D and $D^2$ have slide-bearings in line for the binder-frame. To the lower bar of the truss $B'$ there are secured the usual brackets, $D^3$ and $D^4$, which at their upper ends have similar slide-bearings for the binder-frame. The binder-frame has, besides its usual principal standard, E, and arms, $E'$ $E^2$, two parallel bars, $E^3$ $E^4$, made of gas-pipe and secured at the rear end to the casting $E^5$, which serves as a base for the standard E, and at the forward part to the bar $E^6$, which connects the bars $E^3$ and $E^4$. An oblique brace, $E^7$, is also extended between said parallel bars to stiffen the rigid base-frame for the binder-frame, which is formed by the bars $E^3$, $E^4$, $E^5$, $E^6$, and $E^7$, of which the bars $E^3$ and $E^4$ constitute at the same time the sliding supports of the binder-frame and slide in the bearings described in the main frame. From the rear inner post, $C^3$, a slanting bar, $C^5$, is extended stubbleward and upward across the post $C'$, to which it is bolted, and beyond the same it is provided with a journal-bearing for the wheel F, which communicates power to the binder and is located immediately in the rear of its said bearing, which position, when the binder is adjusted for binding corn, as shown in Fig. 1, is forward of the vertical plane of the binder gear-frame standards E. The hub of this wheel has a square opening for the shaft $f$, which is the binder main driving-shaft and also the packer-shaft. Said shaft is journaled in the binder standard-base $E^5$ rearward from the bracket or brace-bar $C^3$, and also in a bar, $E^3$, which is rigidly secured to the binder-frame arm $E'$ and to the bar $E^3$ forward from the said bracket or brace-bar $C^3$; and when the binder is moved back or forward the shaft $f$ slides therewith through the hub of the wheel F, the portion of said shaft between its bearing in the binder-frame being square, to fit the opening in the hub.

In order that it may not be necessary to increase the width of the incased sidewise-conveying mechanism, which, as herein illustrated, is also an elevator, beyond a moderate width, in order to adapt it to receive and convey the stalks, even when they are of unusual length, there is provided a device for cutting off the heads of unusually long stalks above the point where the highest ears occur. This device is named a "header." It comprises a disk or hub, G, secured on the shaft $n$ of the lower or driving roller of the upper elevator-canvas rearward of the elevator-inclosing case or sheath, and radial cutters G′, secured to such hub, having eccentric cutting-edges $g'$, said cutters located and revolving close against the outer edge of the elevator rear side sheath, T, which is of metal plate or sheet, and may be armed at that point with an edge piece, $g^2$, constituting a shear-blade, though the sharpened edge of the elevator-sheath T may suffice. The long stalks as they are advanced toward the elevator project their heads rearward beyond the elevator rear sheath, and thus enter the jaw of the shears formed by the blade $g^2$ and one of the cutters G′, and are severed by the revolution of the latter, so that the stalk can enter the elevator. The rear sheath of the case T being of metal and thin, the slight extra length left to the stalk on account of the cutter being outside the case will not prevent the stalk entering the case properly, whereas if the case were thick the cutter would probably have to be located inside. The gatherer comprises a frame, J, secured to the finger-bar and projecting forward, having a bracket, $J^8$, secured underneath its rear upper end, in which bracket is journaled the shaft $J^3$, which extends through to the upper side of the frame J, and there has fastened to it a sprocket-wheel, $j^3$, which drives the gathering-chain $J^5$. Said chain passes round the chain-wheel $j^4$ on the shaft $J^4$ at the forward lower end of the frame J. $J^9$ is a stripping and stalk-guiding board located above the chain $J^5$, suitably supported on the frame J. The gatherer-frame is braced by the brace $J'$, which is secured to the bracket $J^8$, and thence extends to the forward side of the elevator-frame, where its rear end is secured, and by the brace $J^2$ fastened to the lower forward end of the frame J, and extending thence also to the elevator-frame and made fast. This gatherer I do not claim as my invention, but only the mode of communicating power to it, which is by means of a chain, $J^6$, which is driven by a sprocket-wheel, $j^6$, on the forward end of the shaft of the lower or driving roller of the upper elevator. Said chain passes thence around the sprocket-wheel $J^7$, which is journaled in a bracket, $J^8$, secured to the gatherer-frame J, and which sprocket-wheel has rigid with it a beveled gear-wheel, $j^7$, which meshes with and drives the beveled gear-wheel $j^8$ on the vertical shaft $J^3$ of the gatherer.

The communication of driving-power to the mechanisms mentioned is effected by the chain K, which passes over the sprocket-wheels on the rear ends of the shafts of the driving-rollers of the lower and upper elevators, (lettered, respectively, K′ and $K^2$,) the sprocket-wheel $K^3$ on the rear end of the platform-conveyer-driving roller-shaft $k^3$, the sprocket-wheel H, and the binder-driving sprocket-wheel F. The wheel H is the driving-wheel in this train, its shaft being actuated by the pinion $H^5$ thereon, to which power is communicated by familiar means from the driving-wheel. Guiding and tightening pulleys $K^4$ and $K^5$ are located at suitable points on the frame to give the chain good hold on all the sprocket-wheels.

When this machine is to be used to cut and bind small grain, the binder is required to be considerably farther forward than when it is used to bind Indian corn in the manner above described; and, further, the header is no use in handling small grain. To adapt it, therefore, to this latter use the header is disused, being removed from the shaft $n$. The binder has the slide-bars $E^3$ and $E^4$ extended rearward of the rear gear-standard, E, and base $E^5$, and the shaft $f$ is likewise extended; and when it is to be adapted to small grain the caps of the boxes which form the slide-bearings in the brackets D and $D^2$ are removed, and the box which forms the bearing of the wheel F in the slant post $C^5$ is similarly treated, and the binder is lifted out of its supports and replaced therein, with the gearing-standard E and its base $E^5$ forward of the vertical plane of the bracket D. The wheel F may be removed and replaced on the shaft $f$ rearward of the gear-standard E; but I prefer to provide two wheels precisely alike, each adapted to slide on and drive the shaft, the wheel F being located forward of the gear-standard and used when the binder is set for binding Indian corn, and the wheel F F being located in rear of the gear-standard and used in binding small grain. To the outer truss, B′, there is secured a bundle-carrier frame, P, the carrier being of the form shown in Patent No. 358,934, granted March 8, 1887, to Burr A. Kennedy and myself.

It will be obvious that the header would perform precisely the same function in respect to to any less inclined or even horizontal conveyer as it does with respect to the elevator, and my invention is not restricted to its use with an inclined or elevating conveyer, but comprehends its use with a sidewise-operating conveyer, regardless of its direction or inclination.

I claim—

1. In a corn-harvester, in combination with conveying mechanism which includes an endless belt operating transversely with respect to the stalks, a case in which such endless belt travels and into which it is adapted to convey the stalks, the rear or head end of such case being armed with a metal edge at the entrance of the case, and a cutter fixed on the shaft of such endless belt and operating past such metal edge at the entrance of the case to sever the portion of the heads of the stalks which protrude beyond such cutter to permit them to enter the case, substantially as set forth.

2. In a corn-harvester, in combination with conveying mechanism which includes an endless belt operating transversely with respect to the stalks, and a case in which such belt travels and into which it is adapted to carry the stalks, such case having its rear or head end formed of thin metal plate or sheet, a cutter fixed on the shaft of the driving-roll of such conveyer rearward of the rear or head end of the case and operating past the edge thereof and co-operating with said edge to sever the protruding portion of the heads of the stalks to permit the stalks to enter the case, substantially as set forth.

3. In combination with the main frame and the binder-frame sustained and movable back and forward thereon, the main frame having slide-bearings for the binder-frame, which comprises the gear standard or bracket and has slide-bars, which are held in such gearing standard or bracket and extend rearward therefrom and adapted to fit to the slide-bearings both in front and in rear of said standard, substantially as set forth.

4. In combination with the binder-frame and the main frame which sustains it, the binder main driving-shaft having a bearing in the binder rear gearing-standard and projecting rearward therefrom, and two similar driving-wheels on said shaft, one located forward of the gear-standard and the other rearward of the same, substantially as and for the purpose set forth.

5. In combination with the main frame and the binder-frame sustained thereon, the binder main driving-shaft having a bearing in the binder rear gearing standard or bracket, the main frame having a bearing for a driving-wheel in line with said shaft-bearing, and two similar driving-wheels, each adapted to be journaled in said main-frame wheel-bearing and both located on said shaft, one in front of the binder rear gearing-standard and one in rear of same, substantially as set forth.

6. In combination with the main frame and the binder-frame sustained and movable back and forward thereon, the binder main driving-shaft having a bearing in the binder rear gearing standard or bracket and extended both forward and rearward of said bearing and adapted to receive and slide through a driving-wheel, the main frame having a bearing for a driving-wheel located in line with said binder-frame shaft-bearing, and a driving-wheel journaled therein and apertured through its hub to fit said shaft both forward and rearward of its bearing in the rear binder gearing-standard, substantially as set forth.

7. In combination with the main frame and the binder-frame sustained and movable back and forward thereon, the binder main driving-shaft having a bearing in the binder rear gearing standard or bracket and extended rearward of said bearing, the main frame having a bearing for a drive-wheel in line with said bearing on the binder rear gearing-standard, said shaft, both forward and rearward of its said bearing, being adapted to slide through a driving-wheel, and two similar driving-wheels, each adapted to be journaled in said main-frame wheel-bearing and having their hubs apertured to receive said shaft and located thereon, one forward and the other rearward of said shaft-bearing in the binder rear gearing-standard, substantially as set forth.

JOHN F. STEWARD.

Witnesses:
JOHN B. KASPARI,
THOS. H. COSGROVE.